(12) United States Patent
Kirshenbaum et al.

(10) Patent No.: US 10,552,398 B2
(45) Date of Patent: Feb. 4, 2020

(54) DATABASE RECORDS ASSOCIATED WITH A TIRE

(71) Applicant: HEWLETT PACKARD ENTERPRISE DEVELOPMENT LP, Houston, TX (US)

(72) Inventors: Evan Kirshenbaum, Palo Alto, CA (US); George Forman, Port Orchard, WA (US)

(73) Assignee: MICRO FOCUS LLC, Santa Clara, CA (US)

( * ) Notice: Subject to any disclaimer, the term of this patent is extended or adjusted under 35 U.S.C. 154(b) by 295 days.

(21) Appl. No.: 15/555,417

(22) PCT Filed: Mar. 12, 2015

(86) PCT No.: PCT/US2015/020277
§ 371 (c)(1),
(2) Date: Sep. 1, 2017

(87) PCT Pub. No.: WO2016/144367
PCT Pub. Date: Sep. 15, 2016

(65) Prior Publication Data
US 2018/0039661 A1    Feb. 8, 2018

(51) Int. Cl.
*G06F 16/22* (2019.01)
*G06F 16/2455* (2019.01)
(Continued)

(52) U.S. Cl.
CPC ............ *G06F 16/2246* (2019.01); *G06F 1/03* (2013.01); *G06F 16/24539* (2019.01); *G06F 16/90344* (2019.01); *G06F 16/9014* (2019.01)

(58) Field of Classification Search
CPC ........... G06F 16/2246; G06F 16/24553; G06F 16/90344; G06F 16/24539; G06F 1/03; G06F 16/9014
See application file for complete search history.

(56) References Cited

U.S. PATENT DOCUMENTS

| 5,787,430 A | 7/1998 | Doeringer et al. |
| 6,614,789 B1 | 9/2003 | Yazdani et al. |

(Continued)

FOREIGN PATENT DOCUMENTS

| EP | 1052576 | 11/2000 |
| WO | WO-01-80079 | 10/2001 |

OTHER PUBLICATIONS

Bast, H. et al.; "Output-sensitive Auto completion Search"; Jul. 3, 2006 ; http://people.mpi-inf.mpg.de/~bast/papers/autocompletion-spire.pdf.

(Continued)

*Primary Examiner* — Jorge A Casanova

(57) ABSTRACT

Example implementations relate to database records associated with a trie. For example, a computing device may include at least one processor to receive a query string and determine, based on the query string, a lookup string associated with a plurality of words in an order. The at least one processor may identify, based on the lookup string and a trie associated with the lookup string, a set of records from a database of records, each record in the set being associated with a score that is associated with a degree to which each record matches the query string, wherein the set is identified based on a penalty value calculated for each record based on a hypothesized collection of typing errors sufficient to transform a prefix of a string associated with each record into the lookup string. The at least one processor may provide a result based on the set.

15 Claims, 10 Drawing Sheets

(51) Int. Cl.
  *G06F 16/903* (2019.01)
  *G06F 16/2453* (2019.01)
  *G06F 1/03* (2006.01)
  *G06F 16/901* (2019.01)

(56) References Cited

U.S. PATENT DOCUMENTS

| | | | |
|---|---|---|---|
| 7,107,263 | B2 | 9/2006 | Yianilos et al. |
| 7,809,744 | B2 | 10/2010 | Nevidomski et al. |
| 8,032,546 | B2 | 10/2011 | Arasu et al. |
| 8,140,462 | B2 | 3/2012 | Lambov |
| 8,438,166 | B1 | 5/2013 | Treder |
| 8,631,035 | B2 | 1/2014 | Li et al. |
| 2008/0077570 | A1 | 3/2008 | Tang et al. |
| 2011/0078243 | A1* | 3/2011 | Carpenter ............ G06F 17/246 709/204 |
| 2012/0143897 | A1 | 6/2012 | Wei et al. |

OTHER PUBLICATIONS

Caron, E. et al; "Dynamic Prefix Tree for Service Discovery Within Large Scale Grids"; Sep. 6-8, 2006 ; http://ieeexplore.ieee.org/xpl/articleDetails.jsp?tp=&arnumber=1698600.

Li, Y. et al.; "A Two-dimensional Click Model for Query Auto-completion"; Jul. 6-11, 2014; htttps://dl.acm.org/citation.cfm?id=2609571.

SaiKrishna, V. et al.; "String Matching and Its Applications in Diversified Fields"; Jan. 2012; http://ijcsi.org/papers/IJCSI-9-1-1-219-226.pdf.

Wong, B. et al.; "Approximate Matching for Peer-to-peer Overlays with Cubit"; Oct. 2, 2009, https://cs.uwaterloo.ca/~bernard/tr-cubit.pdf.

International Searching Authority., International Search Report and Written Opinion dated Apr. 22, 2016, for PCT Appln No. PCT/US2015/020277 Filed Mar. 15, 2015, 14 pgs.

* cited by examiner

CUSTOMER INFORMATION

Company: `anti square 3102`

- ANTI-FREEZE CORPORATION; 123 MAIN STREET; SAN
- ABC MARKET; 432 ANTITHESIS SQUARE; SAN JOSE; C
- ANTICS; 90 GOTCHA SQUARE; OAKLAND; CALIFORNIA
- ANTARCTIC PRODUCTS; 310 2ND AVENUE; PALO ALTO
- ANT INCORPORATED; 32 UNION SQUARE; MENLO PARK
- FRANTIC PARTY SUPPLY; 102 MARKET STREET; SQUAW

Street:
City:
State:
Postal Code:
Country:

DATABASE RECORDS ASSOCIATED WITH A TIRE

BACKGROUND

Many entities (e.g., enterprises, organizations, computer applications, etc.) utilize databases for storage of data relating to the entities. For example, a business may maintain a database of customer information, and the customer information may be accessed by querying the database. Data stored in these databases may be accessed and updated for various purposes.

BRIEF DESCRIPTION OF THE DRAWINGS

Some examples of the present application are described with respect to the following figures:

FIG. 2 is an interface diagram of an example user interface for accessing database records associated with tries;

DETAILED DESCRIPTION

As described above, data stored in a database may be accessed and updated for various purposes. For example, a company may receive phone calls from customers for various reasons (e.g., new orders from customers, service-related calls from customers, etc.), and information associated with the customer may be entered in the company's database. However, in some examples, the customer may already have an existing database record in the company's database, and entering the customer's information as a new record may be redundant.

The technology disclosed herein allows an employee of a company to efficiently access existing records associated with customers. When a user begins entering customer information into a form, information associated with matching existing customer records may be provided to the user such that the user may select a matching record to automatically populate the form. Matching records provided to the user may be based on the information entered by the user and may match the entered information exactly and/or may match based on accounting for misspellings or typing errors (e.g., dropped letters, spuriously inserted letters, substitutions of one or more letters for one or more other letters, transpositions of letters, etc.), superfluous words, abbreviations, use of related words and/or phrase, aliases, acronyms, synonyms and/or equivalent terms, foreign languages, and the like, that may be associated with the information provided by the user. For example, if a user begins entering information for Customer A and a record associated with Customer A currently exists in the database, the user may select the Customer A record from a list of records provided to the user, where the list of records provided may include records that may nearly match the information that the user has entered into the form. The list of records provided may be updated as the user types based on the relevancy of records with respect to the user input. In some examples, the list of records provided may account for one or more words that may be in the same field and/or different fields of the form.

Figure 1:
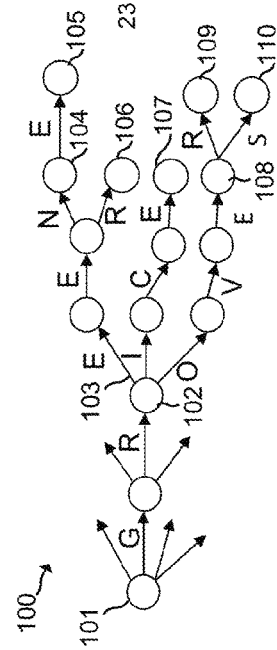
FIG. 1 is a diagram of an example trie and portions of its corresponding tables of parallel arrays.

Referring now to the figures, FIG. 1 is a diagram of an example trie 100 and portions of its corresponding tables of parallel arrays. An in-memory trie-based representation of the information associated with records in a database for a company may be used to provide matching records to a user as the user types a query. A trie, such as example trie 100, is a tree data structure that is used to represent a set or a multiset of strings or of records associated with string keys. A string may be a sequence of characters in a character set. Example trie 100 may represent a collection of records, including records associated with the strings "GREEN," "GREENE," "GREER," "GRICE," "GROVE," "GROVER," "GROVES," and no other strings alphabetically between "GREEN" and "GROVES." Within example strings, punctuation marks inside of delimiting quotation marks should be construed as serving their normal purpose as punctuation and not as specifying characters of the string. In trie 100 of FIG. 1, arrows that do not lead to nodes represent edges leading to other parts of trie 100 that are not shown and that may represent other strings in the collection that are not alphabetically between "GREEN" and "GROVES." The edges of a trie may be labeled with characters or character sequences, such as edge 103 labeled with character "E." Each node of the trie may represent the character sequence that may be obtained by concatenating the edge labels along the path to that node from the trie's single root node (e.g., root node 101 of FIG. 1).

For example, node 104 may represent the character sequence "GREEN," node 105 may represent the character sequence "GREENE," node 106 may represent the character sequence "GREER," node 107 may represent the character sequence "GRICE," node 108 may represent the character sequence "GROVE," node 109 may represent the character sequence "GROVER," and node 110 may represent the character sequence "GROVES." Each node of the trie may be associated with a prefix of one or more strings in the set represented by the trie. For example, node 102 may be associated with the prefix "GR." Each node of trie 100 may also be associated with the collection of strings, and/or the set of records associated with such strings, that match the prefix associated with the node. For example, node 104 may be associated with the collection containing "GREEN" and "GREENE," node 107 may be associated with the collection containing only "GRICE," and node 102 may be associated with the collection containing all strings in trie 100's associated set from "GREEN" through "GROVES." Each leaf node of the trie may be associated with a string in the set. The prefix of a string may be the complete string, The trie may represent possible ways to correctly type any of the strings that may be retrieved, without accounting for misspellings but accounting for variation due to the substitution of abbreviations, related words and/or phrases, aliases, acronyms, synonyms and/or equivalent terms, foreign languages, and the like; variation due to the omission of words (e.g., commonly omitted words or noise words such as "the"); or other similar variation.

As the user types, the typed text may be passed to a predictor that may maintain a set of cursors that may identify nodes of the trie 100 that represent prefixes of strings in the set of strings that are similar to the typed text. The cursors in the set of cursors may also contain associated penalty values reflective of the typing errors that the user may be inferred to have made had the user intended, by the typing, to have typed the prefix string associated with each identified node. The penalty values may be numeric (e.g., integers or floating-point numbers), categorical (e.g., values taken from an enumerated type), structured data, and the like. For each new character processed, the predictor may review each cursor and determine, based on the character and the labels associated with the edges leading from the cursor's node, which, if any, may be compatible with the character being typed, taking into account the possibility that the character may have been correctly typed, may have been incorrectly typed in place of the correct character, may have been a spurious insertion, may have been the second character in a transposition, may follow one or more characters erroneously omitted, and the like, and also taking into account rules relating to the maximum tolerable number of typing errors or the maximum tolerable penalty value due to typing errors. Based on this determination, the set of cursors may be updated to account for the new character, deleting any cursors whose penalty value may be above a pre-defined threshold. The cursor set may be updated for each character of the input string, and the cursors within the cursor set resulting at the end of the string may identify nodes associated with records that may nearly match the inputted query. The matching records may be provided to the user in response to the user's query.

In some examples, a matching record may be provided by providing information related to the matching record (e.g., a key or other information that allows access to the record, a subset of the information contained in the record, a value computed based on the information contained in the record, etc.). In some examples, the matching records may be provided in a particular order based on any suitable criteria (e.g., based on the penalty value associated with the cursors, reflective of the errors inferred between the typed string and the strings associated with the matching records). The techniques disclosed herein allow lookup of records that may have multiple fields (e.g., company name, street address, city, state, country, contact name, etc.). In some examples, the techniques disclosed herein may use one trie per field (e.g., per column in the database) and may allow the user to type prefixes of any and/or all of the columns in any order and in any interface field of the interface used to specify the query.

In some examples, earlier queries may be leveraged by maintaining caches indexed by prefixes of strings associated with the earlier queries or by computed hashes or other values associated with such prefixes. For example, a results cache of the result set of entire queries may be maintained such that when the same query is repeated, the answer may be within the cache and may be returned or otherwise used without updating cursor sets. A starts cache of the cursor sets generated at each stage of a query may also be maintained, allowing the predictor to pick up where a particular stage of a prior query left off such that only new characters are processed. Such prior queries may have been obtained from the same user as the one responsible for the current query or from a different query. In some examples, some or all of the cache may have been pre-populated with the results of processing prefix strings that may not correspond to any query obtained from actual users. In some examples, the system may, based on analysis of queries received, analysis of records selected, or any other suitable grounds, decide to add entries to the cache based on prefix strings that may not correspond to any query obtained from actual users.

As used herein, the term "database" may refer to any collection of information, such as information stored in a relational database, in files or directories in a file system, in in-memory data structures, and the like. The term "record" may refer to any element of a database. The terms "field", "data field", and/or "column" may refer to any piece of data or metadata of a type common to at least some records in a database. In some examples, the data that may be included in the fields of a record, or in any single field of a record, may be stored as a unitary entity or may not be stored as a unitary entity. While the examples described herein include examples of employees of a company searching for records containing information about the customers of that company, one of ordinary skill in the art will appreciate that the techniques described herein may also be applicable to other suitable scenarios, such as searching databases having records containing information about employees, suppliers, merchants, products, documents, webpages or websites, movies, programs, geographic entities, and the like. Additionally, the searches may be performed by people who are or are not employees of a company, such as customers, patrons, visitors, members of the general public, and the like. In some examples, those performing the searches may be programs of other non-human entities.

FIG. 2 is an interface diagram of an example user interface 200 for accessing database records associated with tries. User interface 200 may be used to enter customer information into a database. A user may enter information into the various fields of user interface 200 (e.g., company name, street, city, state, postal code, country, etc.). For example, a user may enter a query "anti square 3102" in the company name field 202. As the user types the information into field 202, drop-down menu 204 may appear, displaying a list of results associated with existing records that may nearly match the user's entry in field 202, where the matching records are identified using one or more tries associated with the database records. For example, if a user begins typing customer information into field 202 for a particular customer, the user may use drop-down menu 204 to determine that the particular customer already has a matching record in the database, and the user may select the matching record entry (e.g., record entry 206) to automatically populate the fields in user interface 200, which may increase the accuracy and speed at which a user may find and enter customer information. In some examples, manners of presenting records and allowing the user to select records other than a drop-down menu may be employed. For example, user interface 200 may have a dedicated area of the display for listing potentially matching records. In some examples, the records may be presented in a columnar format that indicates the information associated with particular record fields. In some examples, the records may be presented in a manner that indicates the typing errors (e.g., by displaying the actual typing errors, by displaying the number of typing errors that were inferred, by displaying the penalty value associated with the typing errors, etc.) or otherwise provides information to help the user understand why the records are taken to correspond with the input.

In some examples, a user may begin typing information in any field of user interface 200, and user interface 200 may display matching records based on the typed information matching any field of user interface 200. For example, a user may begin typing "anti square 3102" in field 202, which may be the input field associated with the "Company" field of the record, and drop-down menu 204 may display records that contain similar text in any field of any record. As shown in the example of FIG. 2, drop-down menu 204 may display a record having "anti," or a word similar to or a variation of "anti," in the company name field 202 (e.g., Anti-Freeze Corporation, Antics, Antarctic Products, Ant Incorporated, Frantic Party Supply), street field (e.g., 432 Antithesis Square), city field, state field, postal code field, and/or country field. In some examples, user interface 200 may include an input field for the entry of free-form queries that may be associated with multiple record fields, and the interface fields corresponding to specific record fields may be display-only or may be limited to specifying queries for values of those specific record fields. In the case where interface fields are limited to specifying queries for values of those specific record fields, selecting a value from the drop-down menu associated with the input string in a record-field-specific query field may, in some examples, limit the possible values returned by queries typed in other fields to those associated with records that have the selected value for the specific record field.

In some examples, as the user types information into a particular field, the matching records displayed in drop-down menu 204 may be updated based on newly typed information. For example, after the user types "anti" in field 202, drop-down menu 204 may display records matching "anti." When the user types additional information in field 202, such as "square," drop-down menu 204 may be updated with records matching the information typed in field 202 (e.g., "anti square" may retrieve some records that include "square" in the street field). In some examples, the updated record list may include records not previously in the list, may omit records previously in the list, and/or may reorder records previously in the list.

Figure 3:
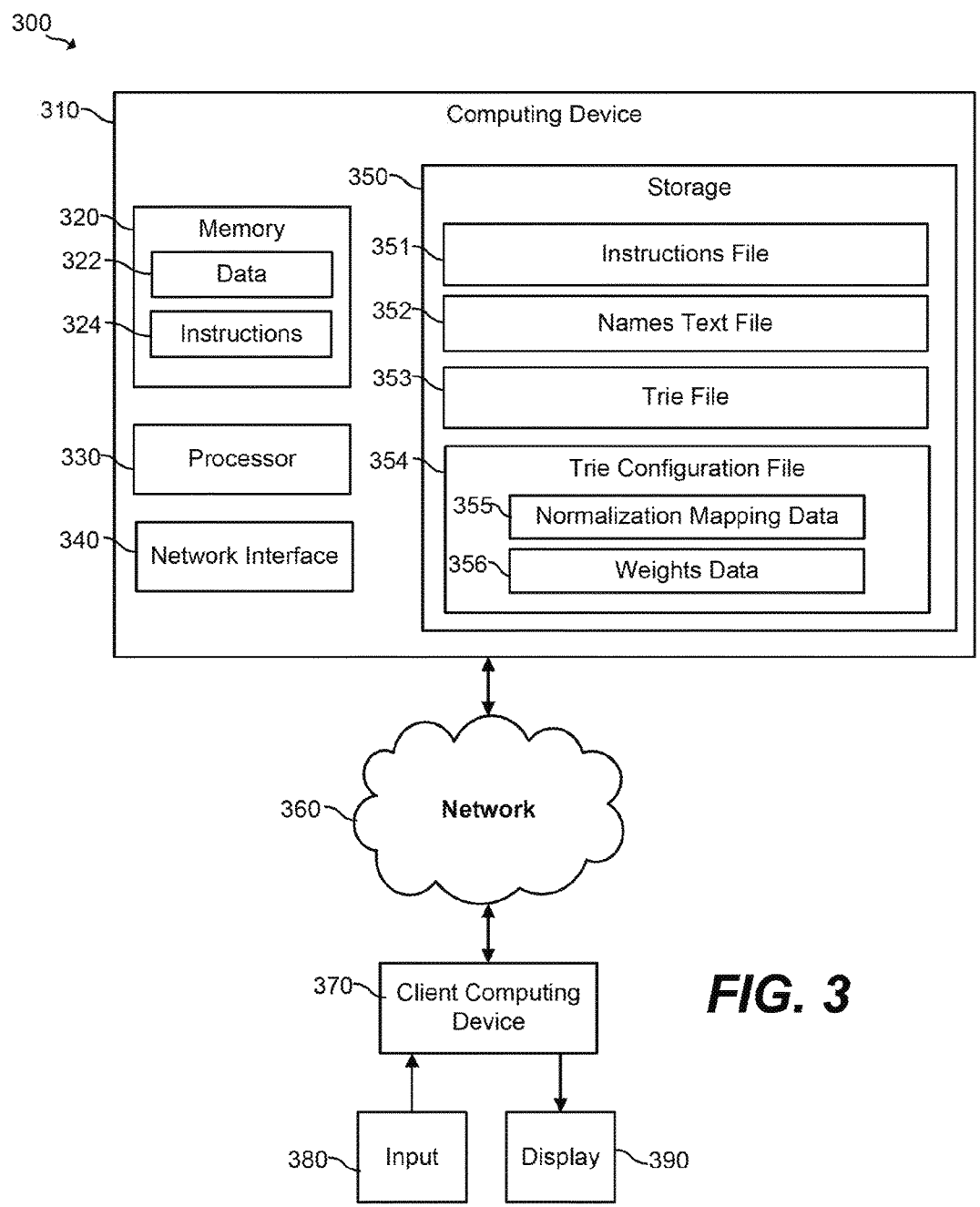
FIG. 3 is a block diagram of an example system for accessing database records associated with tries.

FIG. 3 is a block diagram of an example system 300 for accessing database records associated with tries. System 300 includes computing device 310 in communication with client computing device 370 via network 360, which may be any suitable network. In some examples, one or more portions of network 360 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks. Computing device 310 may receive a query from client computing device 370 via network 360, and in response, computing device 310 may send results of the query to client computing device 370 over network 360. In some examples, multiple client computing devices 370 may be in communication with computing device 310.

Computing device 310 may be any suitable computing device for receiving and processing a query. Computing device 310 may be, for example, a web-based server, a local area network server, a cloud-based server, a notebook computer, a desktop computer, an all-in-one system, a tablet computing device, a mobile phone, an electronic book reader, a printing device, or any other electronic device suitable for providing database records using tries associated with the database records.

Computing device 310 may include memory 320, which may be any suitable type of volatile or non-volatile computing device memory. In some examples, memory 320 may be a machine-readable storage medium that may be any electronic, magnetic, optical, or other physical storage device that contains or stores executable instructions, such as instructions 324. Instructions 324 may be any suitable instructions for processing a query using data 322 in memory 320.

Computing device 310 includes processor 330, which is a tangible hardware component that may be a central processing unit (CPU), a semiconductor-based microprocessor, and/or other hardware devices suitable for retrieval and execution of instructions 324 stored in memory 320. Processor 330 may fetch, decode, and execute instructions 324 using data 322 to control processing of a query received from client computing device 370.

Computing device 310 may include network interface 340, which may be any suitable network interface capable of interfacing with network 360. Network interface 340 may allow computing device 310 to communicate with other computing devices (e.g., client computing device 370) over network 360.

Computing device 310 includes storage 350, which may be any suitable storage device capable of storing data, such as instructions file 351, names text file 352, trie file 353, and trie configuration file 354, which may include normalization mapping data 355 and weights data 356. Instructions file 351 may include instructions for processing a query. Names text file 352 may include names that may be associated with a trie. Trie file 353 may include data associated with one or more tries. Trie configuration file 354 may include data associated with configurations for one or more tries, such as normalization mapping data 355 and weights data 356. In some examples, storage 350 may be the same as, or a part of, memory 320.

Client computing device 370 may be any suitable computing device for submitting a query and receiving results of the query. Input 380 may be any suitable input device in communication with client computing device 370 and may be used to input data to client computing device 370, such as inputting a query. Display 390 may be any suitable display device in communication with client computing device 370 and may be used to display data, such as an inputted query, results to a query, and the like. Client computing device 370 may be, for example, a web-based server, a local area network server, a cloud-based server, a notebook computer, a desktop computer, an all-in-one system, a tablet computing device, a mobile phone, an electronic book reader, a printing device, or any other electronic device suitable for submitting a query and receiving results of the query. In some examples, client computing device 370 may be the same device as computing device 310, and no communication using a network such as network 360 may be utilized.

A trie may include one or more arrays representing information associated with records in a database and may be used to identify records that may nearly match a query received from a user. In some examples, each column in the database may be represented with a trie.

In some examples, a trie may represent a set of names that may be possible completions to queries. In some examples, the names may include references to text that may be stored in one or more files (e.g., Names Text File 352 of FIG. 3), database tables, and/or in a location other than in the memory of the computing device operating the techniques disclosed herein. This may allow for a relatively larger number of possible names, where only the names that are returned as suggestions in response to user-provided queries may be brought into memory as needed and, in some examples, cached. Each name or each record associated with each name may further be associated with a corresponding weight that may indicate an a priori estimate of how likely it is that a user may intend to search for that name or record. This weight may be combined with a penalty reflective of inferred typing errors when determining which records to suggest and in what order. In some examples, the weights may be specified at or near system deployment time. In some examples, the weights may be modified at or near runtime based on the selection of records from lists of suggestions or based on other information. In some examples, the same weights may be used for queries received from some or all users. In some examples, different weights may be used for processing queries received from different users based on information known about the different users (e.g., their geographic location, the product line they typically sell, their past queries, etc.). Each name may further be associated with an indication of an ordering (e.g., an alphabetical ordering) to be used to order suggestions that may otherwise be considered to be equivalently likely.

Figure 4:
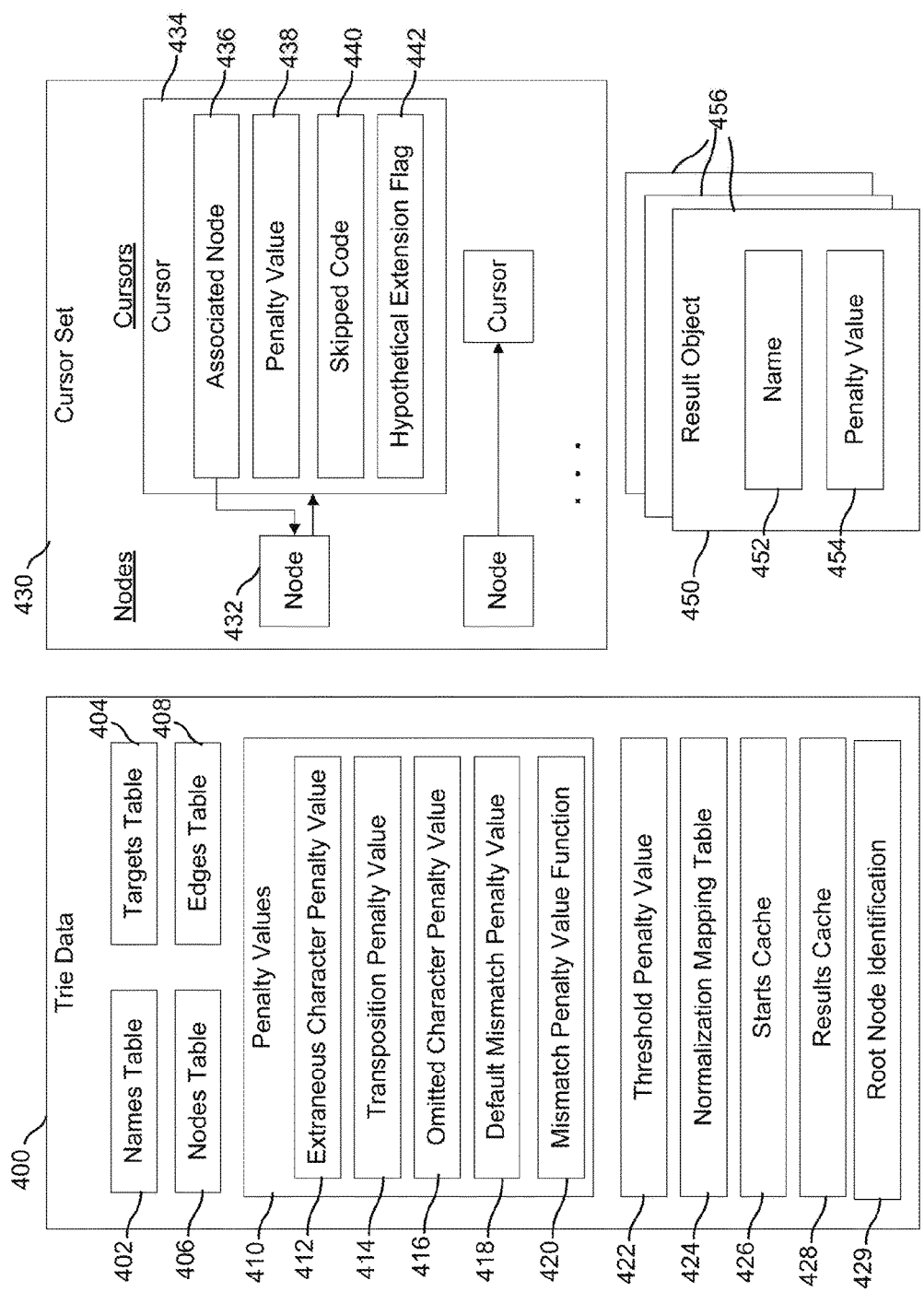
FIG. 4 is a block diagram of example data structures for accessing database records using a single trie.

FIG. 4 is a block diagram of example data structures for accessing database records using a trie, some of the details of which are expanded upon in FIG. 1. These data structures may be stored within in-memory data 322 of FIG. 3. Among these data structures are trie data 400 associated with a trie (e.g., trie 100). A data structure for trie data 400 may include names table 402, targets table 404, nodes table 406, and edges table 408, which may be similar, respectively, to the example names table 120, targets table 140, nodes table 160, and edges table 180 of FIG. 1, which will be explained in more detail below. Descriptions of elements contained within trie data 400 should not be construed to imply any particular implementation. In particular, in some examples, trie data 400 may be a logical way of referring to some or all data associated with a given trie. Within trie data 400, information relating to the names associated with a trie (e.g., trie 100) may be contained in a table (e.g., names table 120) that includes parallel arrays (e.g., names array 121 and weights array 122), with the name itself being indicated by an index used to access each of the parallel arrays. In some examples, the ordering indication may be taken to be the order of the elements in the arrays (e.g., as specified by the index). In the depiction of tables 120, 140, 160, and 180 of FIG. 1, numbers followed by colons indicate positions (e.g., row numbers or line numbers) within the respective table and are not part of the contents of the tables themselves. The indication applies to all arrays of a given table (e.g., names array 121 and weights array 122 of names table 120) that are on the same line. Rows that are not indicated should have their row numbers construed by interpolating from nearby indications in the table. The depicted information represents a portion of each table, as indicated by ellipses on the top and bottom rows of each table, but within the portion shown, all rows within that portion of the table are depicted.

In examples in which tables are represented by arrays, a row number used to identify elements in each array may be used to identify elements of the table. In other examples, other representations may be used for tables (e.g., arrays of structured objects, lists of structured objects, parallel lists, key-value stores, etc.) and/or other methods (e.g., pointers, keys, etc.) may be used to index into or otherwise identify elements of the tables. In FIG. 1, the name "GREER," or, equivalently, a record containing that name, is indicated by a reference to row 2102 in names table 120, and this name has an associated weight of 1.0. In some examples, the actual characters that comprise a particular name may be stored externally to names table 120 (e.g., in names text file 352 of FIG. 3), and names table 120 or names array 121 may contain data sufficient to retrieve the characters when required.

In some examples, a trie may also include a set of targets representing possible alternative ways to type each of the names. For example, a name such as "Hewlett-Packard Laboratories" may have among its targets "Hewlett-Packard Laboratories," "HP Labs," and "HPL." Each target may be associated with one of the trie's associated names. For example, a target may be associated with an index into a table of names (e.g., names table 120). In addition, each target may be associated with a penalty value that may be used to allow some targets to be considered to be more or less likely to be proffered than others when searching for specific names. This target-specific penalty value may be added to a penalty value associated with typing errors that may occur on the part of the user entering the query when determining which records to suggest and in what order. Within trie data 400, the information relating to the targets associated with a trie may be stored as a table (e.g., targets table 140) comprising parallel arrays (e.g., target index array 141 and target penalty array 142), with the target itself indicated by an index used to access each of the parallel arrays. In some examples, targets table 140 may be sorted such that for any of the nodes in the trie, the targets that are reachable by proceeding from that node form a contiguous sub-range of the targets table. In the example in FIG. 1, row 2202 of targets table 140 refers, via the index stored in row 2202 of target index array 141, to the name associated with row 2102 of the names table, which is "GREER," and has a target penalty of zero. For the example trie 100, all targets refer to names that are not alternative forms, but in some examples that will not be the case.

In some examples, a trie may also include a set of nodes each representing a possible prefix of one or more targets and each associated with a set of edges specifying which node follows upon seeing a particular next character. The sets may be specified as contiguous ranges of rows representing the targets of the trie and the edges of the trie (e.g., by associating with each node a first target and first edge and a number of targets and number of edges, by associating with each node a first and last edge and a first and last target, etc.). Within trie data 400, the information associated with the nodes associated with a trie may be contained in a table (e.g., nodes table 160) comprising parallel arrays (e.g., first target array 161, N targets array 162, first edge array 163, and N edges array 164), with the node itself indicated by an index used to access each of the parallel arrays. In example trie 100, node 108 representing the prefix "GROVE" is represented by row 2311 of nodes table 160. This node represents a set of records containing three targets, as indicated by the value of row 2311 of N targets array 162, and the three targets are found on three rows of targets table 140 starting with row 2204, as indicated by the value of row 2311 of first target array 161. These targets represent the strings "GROVE", "GROVER", and "GROVES". Node 108 has two outbound edges, as indicated by the value of row 2311 of N edges array 164, and the edges are found on two rows of edges table 180 beginning at row 2411, as indicated by the value of row 2311 of first edge array 163. These edges represent extending the prefix "GROVE" by "R" and "S," respectively.

In some examples, a trie may also include an identification of the root node of the trie. A root node may be the initial node in the trie and may represent the null prefix. In example trie 100, the root node is node 101.

In some examples, a trie may also include a set of edges each representing a transition from one node to another based on seeing a particular next character. Each edge may be associated with a character label and a following node. Within trie data 400, the information associated with the edges may be contained in a table (e.g., edges table 180) comprising parallel arrays (e.g., following node array 181 and edge label array 182), with the edge itself indicated by an index used to access each of the parallel arrays. In example trie 100, edge 103 is represented by row 2400 of edges table 180. Edge 103 has label "E," as indicated by the value of row 2400 of edge label array 182, and its following node is the node represented by row 2301 of nodes table 160, as indicated by the value of row 2400 of following node array 181.

In some examples, trie data 400 may also include penalty values 410 associated with various types or classes of errors the user may be hypothesized to have committed when forming the query. For example, the penalty values 410 may include a penalty value associated with typing a character that is not part of a target string (e.g., extraneous character penalty value 412), a penalty value associated with transposing two characters in a target string (e.g., transposition penalty value 414), a penalty value associated with omitting a character from a target string (e.g., omitted character penalty value 416), a penalty value associated with typing an incorrect character instead of another character that occurs in a target string (e.g., a "mismatch penalty value"), and the like. In some examples, the trie may have different penalty values associated with typing specific incorrect characters in place of specific correct characters, where the different penalty values may be used to model a likelihood of mistyping (e.g., by putting less penalty on pairs of characters that are close to one another on the keyboard and therefore more likely to be accidentally substituted due to typing mistakes), misspelling, and/or mishearing (e.g., by putting less penalty on pairs of characters that represent similar sounds and are therefore more likely to be accidentally substituted due to mishearing a name). In some examples, these different mismatch penalty values may be specified by a mismatch penalty value function 420 that takes as input an expected character and an observed character and returns a penalty value. In some examples penalty values 410 may include a default mismatch penalty value 418 to be used when a mismatch-specific penalty value is not specified. In some examples, trie data 400 may also include a threshold penalty value 422, which may be a maximum sum of penalty values allowed for a match to be considered for retrieval in response to a query. In some examples, threshold penalty value 422 may be specified by a user. In some examples, threshold penalty value 422 may be stored in any suitable manner, including using software associated with accessing records, with a trie, and the like.

In some examples, trie data 400 may also include a normalization mapping table 424 to be used to map an input string to a normalized form that has the property that two input strings that differ only in ways that are considered insignificant are mapped to the same normalized form. In some examples, normalization mapping table 424 may be an array mapping each character to the same or to another character, or mapping a character to zero to indicate that the character is to be ignored. In some examples, normalization table 424 may map some or all uppercase letters to their lowercase equivalents (e.g., mapping "A" to "a") or vice versa. In some examples, normalization table 424 may map some or all accented characters to their unaccented variants (e.g., mapping "á" to "a"). In some examples, normalization table 424 may map some or all Unicode precomposed characters whose canonical decomposition contains a single spacing character and some number of combining characters to the single spacing character or its normalized form. In some examples, normalization table 424 may map characters whose graphical form looks similar (e.g., Latin "A" and Greek capital alpha) to the same normalized form. In some examples, normalization table 424 may map digits in other systems to their conventional equivalents (e.g., mapping Chinese "三" or Arabic "٣" to "3"). In some examples, the normalization mapping may be done using techniques other than by using a table. In some examples, the normalization mapping may map one character to more than one chara e e.g., mapping "½" to "1/2") or vice versa.

In some examples, a trie may also include or may be associated with one or more caches mapping strings associated with previous queries to values computed in response to those queries. These caches may include results cache 428, which may store results previously seen for a given normalized string, and starts cache 426, which may store sets of cursors that were generated when analyzing a string to a particular point. These two caches may be used to avoid redoing work that has already been done previously. In some examples, a value computed based on a string may be used in place of the string when interacting with the caches. The computed value may be computed by means of a hash function, which is a function from strings to numbers that has the property that different input strings are unlikely to result in the same computed value. In some examples, the function described in U.S. Pat. No. 8,266,179 entitled "Method and System for Processing Text," which is herein incorporated by reference in its entirety and which is also known as "Mapped Additive Shift Hashing" or "MASH," or a variant of this algorithm, may be used. In some examples, one or more of the caches may have the property that associating a value with a key may remove an association with a non-equivalent key.

When a query is being processed, cursor 434 associated with the trie (e.g., a trie associated with trie data 400) may be used to represent a possible intended prefix of one or more targets of the trie to which the query may be a possibly mistyped approximation. Cursor 434 may include an indication (e.g., associated node 436) of a node (e.g., node 432) that may have been reached for the query had it been typed correctly, penalty value 438 representing the sum or a similar combination of all the penalty values incurred by typing errors inferred to have been required to reach that node given the input, skipped code 440 indicating a character that was inferred to have been omitted just before the most recent character when the most recent character was inferred to have been correct and used to recognize that apparent cases of a missed character followed by an extraneous character may be cases of transposition of characters, and hypothetical extension flag 442 indicating that the cursor is hypothesized as a skipped-character extension of another cursor, as described below. Cursor set 430 may contain a set of cursors, and it may be represented as a map from nodes (e,g., node 432) to cursors (e.g., cursor 434) that represent reaching those respective nodes (e.g., by having those nodes as the associated node 436 of the cursor 434) to facilitate determining if the cursor set already contains a cursor representing a hypothetical path to a given node. In some examples, when multiple paths to the same node are found, the cursor associated with the lowest penalty value 438 may be kept.

Figure 5:
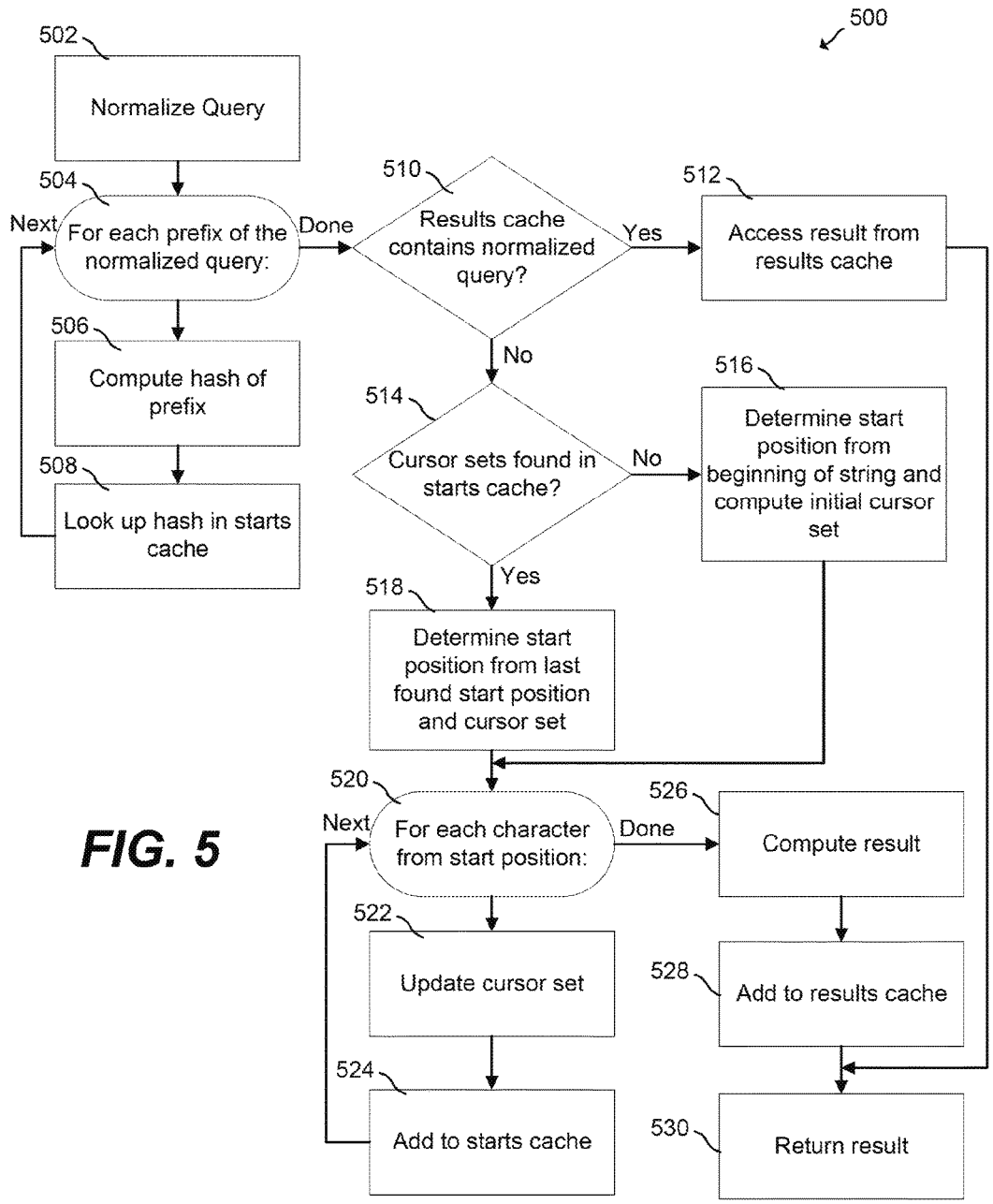
FIG. 5 is a flowchart illustrating an example method of providing database records using a single trie.

FIG. 5 is a flowchart illustrating an example method 500 of providing database records using a single trie, which will be described with reference to components shown in FIG. 4. When a query is received, the query may be normalized (operation 502) using normalization mapping table 424, mapping each received character to its image in normalization mapping table 424 and omitting any characters that may map to an indication, such as a zero value, that the character is to be ignored. In some examples, characters that map to an indication that the character is to be treated as a space character are processed such that runs of multiple space characters may be replaced by a single space character in the output. In some examples, other forms of normalization may be used, including arbitrary functions. The normalized string may be processed character by character. Start cache 426 may be checked to see if cursor set 430 has been cached for each prefix of the normalized string. In some examples, for each prefix of the normalized query (operation 504), an incremental hash function may be applied to each prefix (operation 506), and the resulting value may be used to query start cache 426 (operation 508). In some examples, cursor set 430 may be represented in starts cache 426 as an array of cursors, which may be a different representation from that used elsewhere within the method. Whenever such a cursor set 430 is found in start cache 426, it may be noted as the cursor set to start with, and the index of the next character in the normalized string may be noted as the place to start from, such that the processing may start at the point of the last cached position. When the entire normalized string has been processed, results cache 428 may be checked to see whether this exact normalized string has been processed previously (operation 510). In some examples, the hash value of the entire normalized string may be used to query results cache 428. If there is an entry in results cache 428 corresponding to this hash, the value of this entry may be accessed from results cache 428 (operation 512) and returned as the result of the query (operation 530).

If there is no cached result in results cache 428, it may be determined whether any cursor sets 430 were found in starts cache 426 during operation 508 (operation 514). If any cursor sets 430 were found, then processing starts by establishing a starting context, which may include the last cursor set 430 and index position found in start cache 426 (operation 518). If no cursor sets 430 were found in starts cache 426 during operation 508, processing starts by establishing a starting context, which may include an index position indicating the beginning of the string and a cursor set formed by computing the hypothesized extensions of a single cursor (e.g., cursor 434) that refers (e.g., via associated node 436) to the root node 429 of the trie (e.g., root node 101 of trie 100 of FIG. 1) and has a penalty value 434 of zero (operation 516), as described below with respect to operation 636 of FIG. 6. In some examples, this cursor set 430 may be remembered and used to process multiple queries. For each character following the start position (e.g., the index position of the starting context) (operation 520), the cursor set 430, which may initially be the cursor set of the starting context, may be updated to a new cursor set 430 (operation 522), as described below with respect to FIG. 6, and this new cursor set 430 may be associated in start cache 426 with the prefix of the normalized string that runs through the character just processed (operation 524), or its hashed value in some examples. When characters have been processed through the end of the normalized string, the result of the query may be computed based on the final cursor set 430 (operation 526), and this result may be associated in results cache 428 with the entire normalized string (operation 528), or with its hash value in some examples. The result may then be returned (operation 530).

Figure 6:
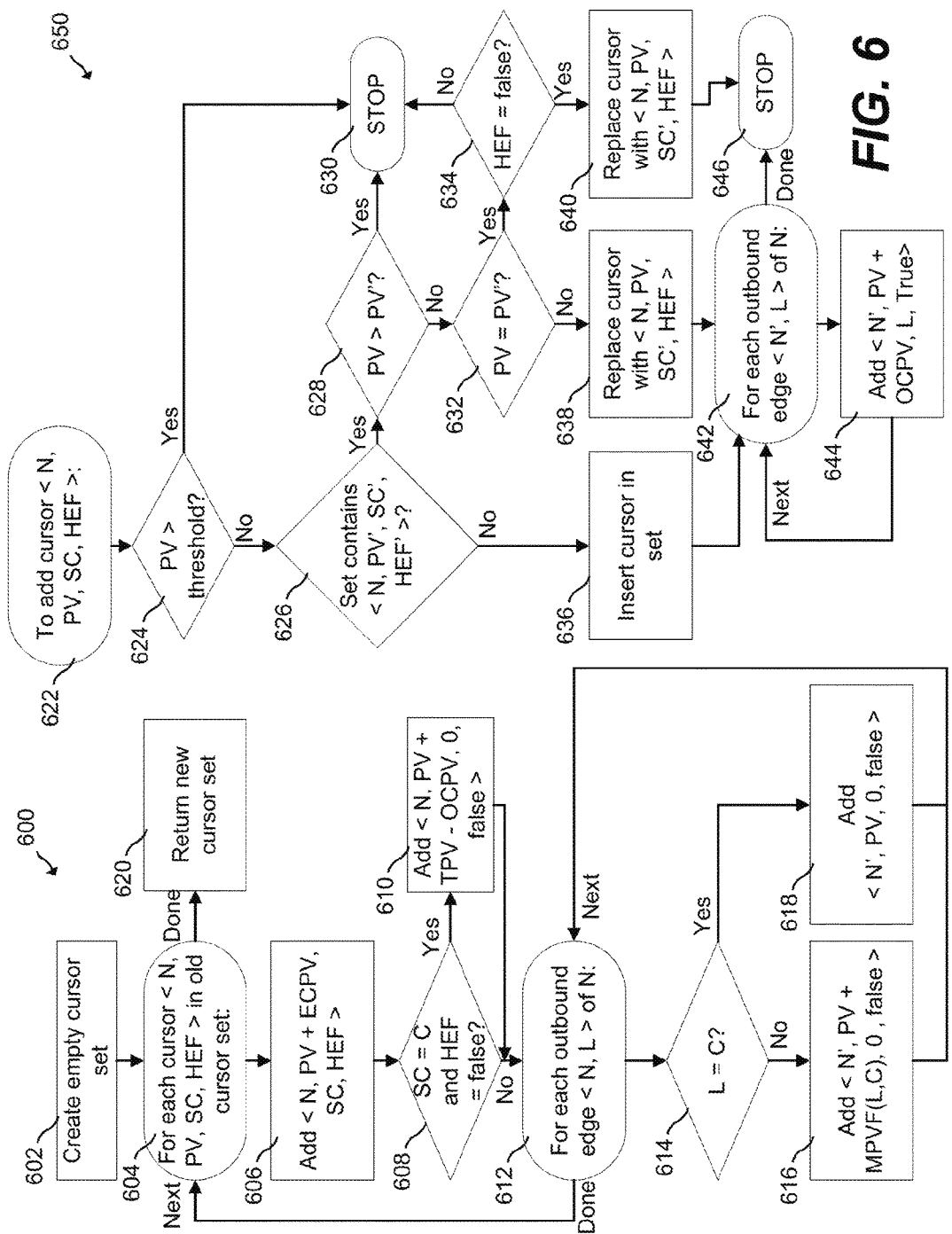
FIG. 6 is a flowchart illustrating example methods of updating a cursor set.

FIG. 6 is a flowchart illustrating example methods 600 and 650 of updating a cursor set 430 as described in FIG. 4. In FIG. 6, a cursor is represented as <N, PV, SC, HEF>, where N is the cursor's associated node 436, PV is the cursor's penalty value 438, SC is the cursor's skipped code 440, and HEF is the cursor's hypothetical extension flag 442; an edge in the trie is represented as <N, L>, where N is the edge's following node and L is the edge's label, the current character is represented as C, extraneous character penalty value 412 is represented as ECPV, omitted transposition penalty value 414 is represented as TPV, omitted character penalty value 416 is represented as OCPV, and mismatch penalty value function 422 is represented as MPVF. As described above, the set of cursors tracks paths within a trie, where the paths are based on the received query and represent hypothesized collections of errors in specifying targets associated with the trie. The set of cursors 430 may be updated as additional characters are added to the query. A cursor set 430 may be used to store information associated with the set of cursors. When a new character is processed, the set of cursors are updated by returning an array of cursors 434 that reflect the previous cursor array and the additional character. To construct this array, a new, empty cursor set 430 may be constructed (operation 602). For each cursor in the old cursor array (operation 604), new cursors reflective of different possible interpretations of the new character may be created, and these new cursors may be added to the new cursor set, (operations 606 through 618). The returned array of cursors (operation 620) may be an array containing the elements of the new cursor set 430 following this operation.

In some examples, new cursors 434 whose penalty values 438 would exceed a maximum allowed or threshold penalty value 422 may be omitted from the new cursor set 430. To reflect the hypothesis that the new character may be a mistake (e.g., an extra character that is erroneous) and that the hypothesized target should remain the same, a new cursor 434 may be created and added to the cursor set 430 (operation 606) with the same associated node as the old cursor 434, a penalty value 438 based on the old cursor's penalty value 438 with the addition of an extraneous character penalty value 412, no skipped code 440, and a hypothesized extension flag 442 equal to that of the old cursor 434.

To reflect the hypothesis that the new character may be the second character of a transposition, it may be determined whether the new character matches the old cursor's skipped code 440 and whether the old cursor is not a hypothesized extension (e.g., its hypothesized extension flag 442 is false) (operation 608). When the new character matches the old cursor's skipped code 440 and when the old cursor 434 is not a hypothesized extension, a new cursor 434 may be created and added to the cursor set 430 (operation 610) that is identical to the old cursor 434 except that the new cursor 434 has no skipped code 440 and its penalty value 438 is based on that of the old cursor 434, with the subtraction of an omitted character penalty value 416 and the addition of a transposition penalty value 414. To reflect the hypotheses that the new character may be a correct character or an incorrect character typed in place of a correct character, the outbound edges of the node associated 436 with the old cursor 434 may be enumerated by referring to edges table 180 (operations 614 through 618). For each such edge (operation 612), it may be determined whether the new character matches the edge's label (operation 614).

If the new character matches the edge's label, a new cursor 434, reflective of the hypothesis that the new character is correct, may be created and added to cursor set 430 (operation 618) with the edge's following node as its associated node 436, the old cursor's penalty value 438, no skipped code 440, and an indication 442 that the new cursor is not a hypothesized extension. If the new character does not match the edge's label, a new cursor 434, reflective of the hypothesis that the new character was erroneously typed in place of the edge's label, may be created and added to cursor set 430 (operation 616) with the edge's following node as its associated node 436, the old cursor's penalty value 438 augmented by a mismatch penalty value associated with the new character being typed in place of the edge's label as its penalty value (e.g., by consulting mismatch penalty value function 420 and/or default mismatch penalty value 418), no skipped code 440, and an indication 442 that the new cursor is not a hypothesized extension.

The process of adding a cursor 434 (operation 622) to a cursor set 430 (e.g., at operations 610, 616, 618, and 644) is described with respect to method 650. Before a cursor 434 is to be added to a cursor set 440, it may be determined (operation 624) whether the cursor's penalty value 438 exceeds a threshold penalty value 422. If it does, the process may stop (operation 630). If it does not, it may be determined whether the cursor set already contains a cursor 434 associated 436 with the same node as the node associated 436 with the cursor 434 being added (operation 626). If it does not, the new cursor 434 may be added to the set of cursors 430 (operation 636). In some examples, method 650 may take as arguments, in place of a cursor 434, information sufficient to create a cursor 434. In such examples, if there is no cursor 434 in the cursor set 430 with the same associated node 436, a new cursor 434 may be created based on the arguments and added to the cursor set 430. If the cursor set already contained a cursor with the node, it may be determined whether the penalty value 438 of the new cursor 434 is greater than (operation 628) or equal to (operation 632) the penalty 438 value associated with the existing cursor 434. If it is greater than the existing value, the existing cursor 434 already hypothesizes a lower-cost set of errors, and the method may stop (operation 630) without modifying the cursor set 430. If it is equal to the existing value, it is determined whether the new cursor is a hypothesized extension by determining whether the hypothesized extension flag is set to false (operation 634).

If the new cursor is a hypothesized extension, the method may stop (operation 630) without modifying the cursor set 430. If the new cursor is not a hypothesized extension, the existing cursor 434 may be marked as not a hypothesized extension (e.g., by clearing its hypothesized extension flag 442) (operation 640), and the method may stop (operation 646). If it is less than the existing value (e.g., it is neither determined to be greater than or equal to the existing value), a hypothesized set of errors reaching the same node but with a lower-cost path to the same node has been found, and the penalty value 438, skipped code 440, and hypothesized extension flag value 442 of the existing cursor 434 may be set to that of the new cursor 434 (operation 638).

To reflect the hypothesis that a correct character was omitted, whenever a cursor 434 that is not associated with a node associated with a cursor 434 in a cursor set 430 is added to the cursor set 430 (e.g., at operation 636), and whenever an existing cursor's penalty value is strictly reduced (e.g., at operation 638), the hypothesized extensions of the cursor 434 may be created and added to the cursor set (operation 644). These new cursors 434 may then have their hypothesized extensions created and added to the cursor set 430 as a result of invoking method 650 recursively at operation 644. To create the hypothesized extensions of a cursor 434, the outbound edges of its associated node 436 may be enumerated (operation 642), and for each such edge, a new cursor 434 may be constructed and added to the cursor set (operation 644), where that new cursor 434 is associated 436 with the edge's following node. The new cursor may have a skipped code 440 equal to the edge's label, an indication that the new cursor is a hypothesized extension (e.g., a hypothesized extension flag 442 with a true value), and a penalty value 438 equal to the old cursor's penalty value 438 with the addition of an omitted character penalty 416. Following the creation of the hypothesized extensions (operation 642), the method may stop (operation 646).

Referring back to FIG. 4 and FIG. 5, once all characters have been processed and a final array of cursors is computed, an ordered collection 456 (e.g., an array, a list, etc.) of result objects 450 may be computed based on the final array of cursors (operation 524). A result object 450 may represent a potential result that may be returned in response to a query. A result object 450 may encapsulate a name 452 and a penalty value 454, where penalty value 454 may be a score associated with a degree to which a record matches a received query string. In some examples, a result object 450 may be comparable with other result objects 450. In some examples, the comparison may be based on a lexicographic order. This order may be any suitable order and may take into account certain criteria, such as preferring the result object 450 with the lower total penalty value (e.g., the sum of the penalty value due to inferred typing errors and the penalty value associated with a target (e.g., from target penalty array 142) associated with the name 452) 454, when neither has a lower total penalty value 454 than the other preferring the result object 450 with the higher weight associated (e.g., from weights array 122) with the result object's associated name 452, and when neither further has a lower name weight than the other, preferring the result object 450 with the lower name index associated with the result objects name 452. In some examples, additional or fewer criteria may be used and the order in which the criteria are checked may differ.

In some examples, the collection 456 of result objects 450 may be converted into an ordered collection of strings, which may be returned to the invoker of the method. The conversion may be performed by mapping each result object 450 to its respective name. In some examples, the collection 456 of result objects 450 and/or the collection of strings may be associated with the query string in a results cache 428. To generate the collection 456 of result objects 450, the final cursor array may be walked. Cursors 434 corresponding to the root node 429 and cursors 434 that have been marked as being a hypothesized extension (e.g., by having a hypothesized extension flag 442 with a true value) may be ignored. For each remaining cursor 434, the targets associated (e.g., via first target array 161 and N targets array 162) with the node associated 436 with the cursor 434 may be enumerated, and for each target, a result object 450 may be created with the name associated with the target and a total penalty value 454 based on the penalty value 436 associated with the cursor 434 and the penalty value associated (e.g., via target penalty array 142) with the target. When two result objects 450 associated with the same name are created, the relatively dispreferred one, based on the comparison between result objects 450, may be discarded. In some examples, a map from names, or their indices, to result objects 450 may be utilized to efficiently detect when such a duplication has occurred. The ordered collection 456 may be ordered such that relatively preferred result objects 450 occur earlier in the collection. In some examples, the ordered collection 456 may be truncated to less than the full number of result objects 450. This truncation may be based on a predetermined maximum length, based on a maximum length established as a parameter to the query, based on a maximum penalty value 454, based on the relative penalty values of result objects in the list, and the like.

The results provided to a user in response to a query may be based on a record schema describing records having multiple data fields (e.g., columns). Examples of various data fields of a record encoding information about a company may include the company name, sector, country, state, city, street, zip code, and the like. In some examples, the query may be interpreted as a sequence of words in any suitable manner (e.g., through word separators such as spaces), and each word may be determined to refer to only one of the data fields. In some examples, a contiguous sequence of words may be determined to refer to only one of the data fields in the determination of each result. In some examples, at most one contiguous sequence of words may be determined to refer to each of the data fields in the determination of each result.

Figure 7:
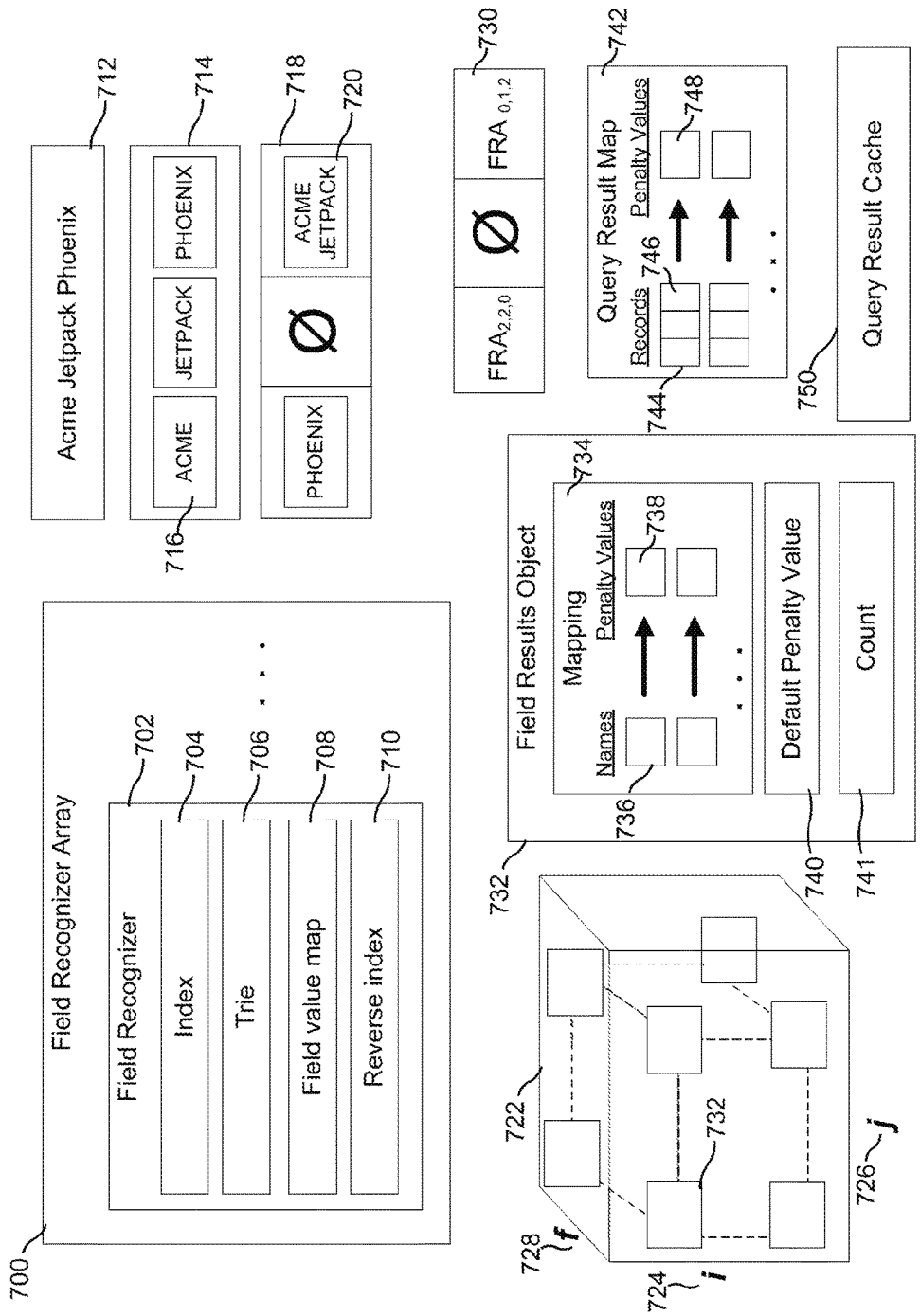
FIG. 7 is a block diagram of example data structures for accessing multi-field database records.

FIG. 7 is a block diagram of example data structures for accessing multi-field database records. These data structures may be stored within in-memory data 322 of FIG. 3. Each multi-field record 744 may contain multiple data fields 746. As used herein, data field 746 may refer either to a named or otherwise identified portion of each record 744 that contains semantically similar information (e.g., a company name data field or a document author data field) or to the value within a particular record associated with such a data field. A field recognizer array 700 of field recognizers 702 may be used to account for various data fields 746 within a record 744. Field recognizer 702, representing a data field 746, may include an index 704 into the field array indicating the field recognizer's position in the array, a trie 706 (e.g., trie data 400 of FIG. 4, a reference to trie data, etc.) to be used to process substrings hypothesized to refer to a target matching the field recognizer's data field 746, a field value map 708 (e.g., an array of integers) mapping records 745 to names associated with the trie 706, representing that a particular record 744 had a particular name as the value associated with the field recognizer's data field 746, or to a distinguished value indicating that there was no value for the field recognizer's data field 746 associated with a given record 744, and a reverse index 710 mapping the trie's 706 name indices to collections indices of records, indicating the records that have a given name as the value associated with the data field 746. In some examples, an offline string table (e.g., a data structure in memory 320 of FIG. 3 that contains references into a file or other representation in storage 350 of FIG. 3) may also be used to store a description of each record. In some examples, the description of a record 744 may be constructed on the fly from the strings associated with the record 744 for each data field 746.

Figure 8:
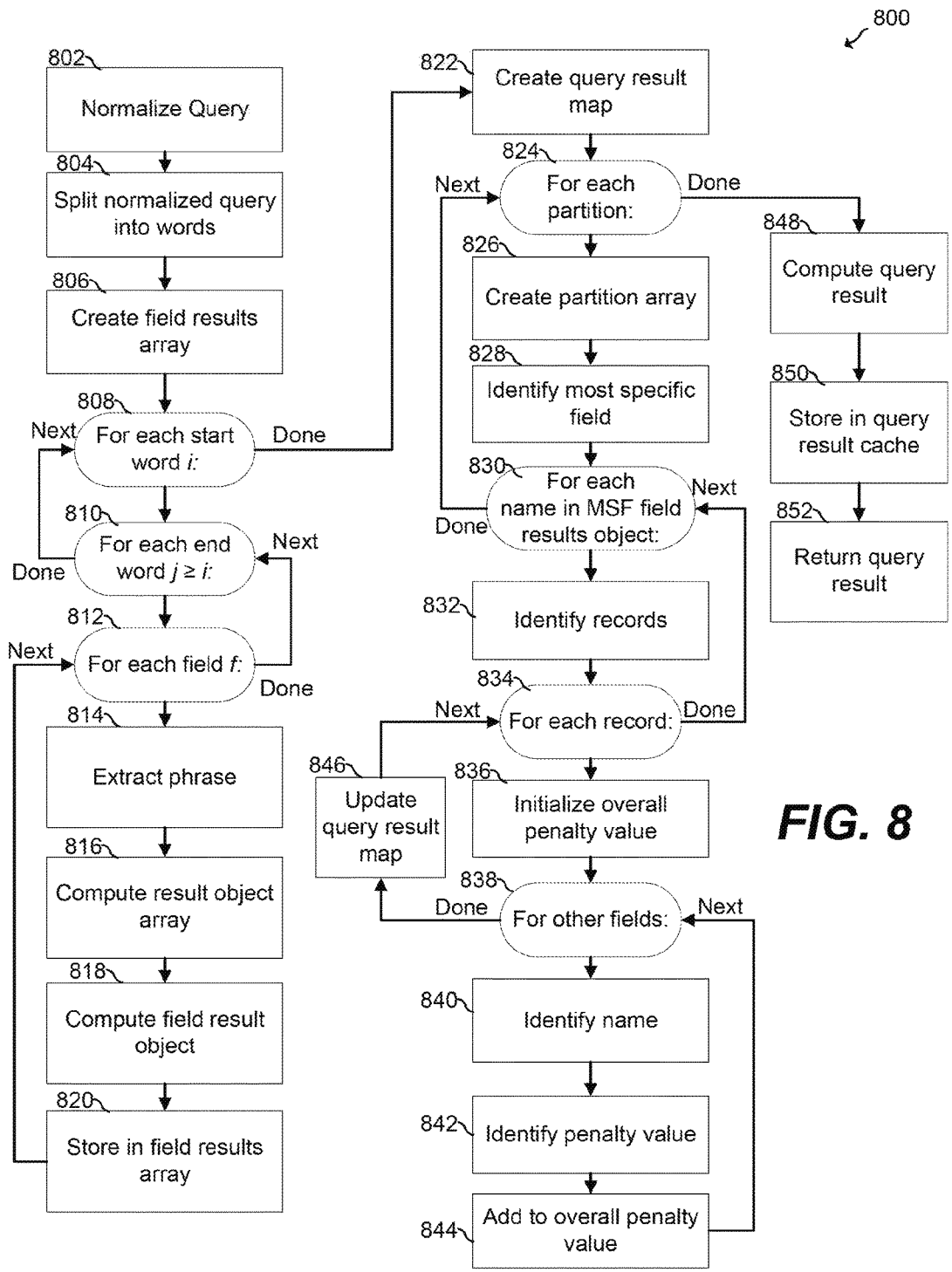
FIG. 8 is a flowchart illustrating an example method for providing multi-field database records.

FIG. 8 is a flowchart illustrating an example method 800 for providing multi-field database records, which will be described with reference to components shown in FIG. 7. To parse words and/or phrases received in a query (e.g., example query 712), the input string of the query may be normalized (operation 802) and construed as a sequence of words (e.g., sequence 714 containing word 716) (operation 804). An initially-empty three-dimensional field results array 722 to hold field result objects (e.g., field results object 732) may be constructed (operation 806). Two indices i 1724 and j 726 of the field results array may represent indices in the sequence of words of the first and last word of a phrase, respectively, and the third index f 728 may represent the position in field recognizer array 700 of the field recognizer 702 representing the data field 746 hypothesized to be the intended target of the sequence of words beginning with the $i^{th}$ word and ending with the $j^{th}$ word. The value of each position of the field results array 722 may be a field result object 732 computed by the corresponding field recognizer 702 based on the result of the field recognizer's trie 706 processing the corresponding sequence of words as a query string. To create the entries in field results array 722, a triply-nested loop is performed. Start word i 724 runs from the index of the first word and ends with the index of the last word (operation 808). End word j 726 starts with start word i 724 and ends with the index of the last word (operation 810). Field index f 728 runs through the indices of field recognizer array 700 (operation 812). Within the nested loop of operation 812, the words running from the $i^{th}$ word through the $j^{th}$ word are extracted as a phrase (operation 814). In some examples, slots in field results array 722 for which i>j may be left empty and ignored.

To construct each field result object 732 in field results array 722, an array 450 of trie-specific results objects 444 of FIG. 4 may be computed using the trie 706 corresponding to the field recognizer 702 associated with the field recognizers index f 728 in the array 722 by invoking method 500 of FIG. 5 as described above and using the extracted phrase as the query string (operation 816). The result objects 444 may each be associated with a data field-specific name 446 and a penalty value 448, as described above for FIG. 4. The result objects 444 may be combined into a field result object 432 (operation 818), which may include a mapping 734 from data field-specific names associated with result objects (e.g., name 736, which may be name 446 from a result object 444) to respective penalty values (e.g., penalty value 738, which may be penalty value 448 from the same result object 444), a count 741 of the number of records covered by the names associated with result objects 444 in the array 450, which may be obtained by looking up the names in the field recognizers reverse index 710 and counting unique values, and a default penalty value 740 to be used when considering records for which the name associated with the data field 746 does not have a corresponding entry in the name-to-penalty mapping 734. In some examples, the default penalty value 740 is constructed to be at least as high as the maximum penalty value 448 associated with any result object 444 in the array of result objects 450. The constructed field result object 736 is stored in the slot in field results array 722 corresponding to the values of i, j, and f used to construct it (operation 820).

Once field results array 722 has been constructed, it may be used to identify any suitable number of records 744 matching the input string of the query 712 (e.g., the ten most closely matching records) by constructing a query result map 742 mapping records 744 to penalty values 748, where penalty values 748 may be scores each associated with a degree to which a record matches a received query string. An empty query results map 742 may be constructed (operation 822), and the possible partitions 718 of the sequence of words 714 into non-overlapping phrases 720 may be enumerated (operation 824), where each phrase 720 may include one or more contiguous words, and where each phrase may be assigned to a field and no field is assigned more than one phrase. In some examples, phrases 720 may partially or completely overlap one another. In some examples, each phrase may be represented by a pair of indices i and j, representing the first and last word of the phrase. For each partition, an array 730 of field result objects 732 may be constructed (operation 826), where the indices of the array 730 may match those of the field recognizer array 700 and where the element at position f of the array 730 may be the element at position<i, j, f>of the field results array 722 when data field f is associated with the phrase running from word i through word j according to the partition 718 and is empty if no phrase 720 is associated with data field f. The data field 746 whose associated field result object 732 has the smallest associated record count 741 may be identified (operation 828). For each name 736 and associated penalty value 738 in the identified data field's field results object's map 734 (operation 830), the field recognizer's reverse index 710 may be used to identify the set of records 744 associated with that name 736 (operation 832). For each such record 744 (operation 834), an overall penalty value may be initialized to the penalty value 738 associated with the current name 736 by the identified data field 746 (operation 836). For each data field 746 other than the identified data field (operation 838) that has a value in array 730, the corresponding field recognizer's field value map 708 may be consulted to identify the name, if any, associated with the current record 744 for the current data field 746 (operation 840), and the map 734 from name 736 to penalty value 738 associated with the field result object 732 for that data field 746 may be consulted to identify a penalty value 738 (operation 842). If no such mapping exists in the map 734, the default penalty value 740 associated with the data field's field result object 732 may be used as the penalty value 738. The resulting penalty value may be added to the overall penalty value (operation 844).

When all data fields have been enumerated (i.e., when operation 838 exits), the overall penalty value may represent the penalty value for the current record 744 according to the current partition 718. In some examples, the weight associated with each name associated with the record 744 (e.g., from weights arrays 122 associated with tries 706 associated with field recognizers 702) may be incorporated into the overall penalty value associated with the record 744. Query result map 742 may be updated for the current record 744 based on the overall penalty value (operation 846) by ensuring that for each record enumerated for any partition, the lowest overall penalty value seen for any partition that enumerated it is retained in query result map 742. When all partitions have been enumerated (i.e., when operation 824 exits), the overall query result may be computed by determining a subset of matching records 744 associated within query result map 742 with the lowest noted penalty values 748 (operation 848). The subset of records may be any suitable number of records 744 to be returned. In some examples, this overall query result may be stored in a query result cache 750 (operation 850), which may be used to bypass some or all of method 800 when a query 712 is identical or similar to a query 712 that has previously been processed. The overall query result may be returned (operation 852).

In some examples, the data associated with each trie may be determined independently and may be updated after the corresponding set of records changes. In some examples, the data structures may be loaded into the memory of a computer by reading one or more files. For example, a trie file containing information about the nodes, edges, and targets of the trie may be read, and a trie configuration file containing information about the weights relating to the names associated with the trie and information sufficient to construct the normalization mapping table associated with the trie may be read. In some examples, a sorted names file may be used to build each trie. The sorted names file may represent each name to be associated with a trie by a line containing a canonical name, a numerical weight associated with the canonical name, and an optional set of aliases associated with the canonical name.

In some examples, rules associated with the process of building the trie may be able to automatically generate some aliases of a canonical name, and the aliases specified in the sorted names file may include those aliases that are not automatically generable from the canonical name. In some examples, the canonical name may be an abbreviation, and the fully spelled out form may be an alias. In some examples, parent companies to the canonical name and/or subsidiaries of the canonical name may be aliases. In some examples, a brand name may be the alias of a canonical company name or vice versa. In some examples, translations to and/or from a language with a different character set may be accounted for with aliases (e.g., Chinese characters, Hebrew characters, etc.). While canonical names and their explicit and/or generated aliases may become targets associated with the trie, the canonical name may be the form included in the set of names associated with the trie. In some examples, an alias of one name may be the alias of another name and/or a canonical name in its own right.

The lines in the sorted names file may be sorted in any suitable manner. In some examples, the lines may be sorted based on user preferences. In some examples, the lines may be sorted alphabetically by canonical name. In some examples, the order in which the lines are sorted is the order in which results with equivalent penalty values may be provided as suggestions and/or is the order that may be used to decide which results to suggest based on a predetermined number of results to be provided in response to a query.

The sorted names file may be processed to create an offline string table representing the trie's names and a configuration file for the trie. The configuration file may include weights for each name, taken from the lines of the sorted names file, as well as the normalization mapping table.

To construct a trie file, the sorted names file may be walked and an unsorted nodes file is constructed as described below. The unsorted nodes file may be sorted in any suitable manner such that all lines with the same target prefix are contiguous in the file (e.g., sorted by a lexicographic sort). The resulting sorted nodes file is processed to build the trie file. To generate the unsorted nodes file, the sorted names file is walked, and each line is expanded into a set of name variants by using a user-supplied name variant generator, which may be a set of rules for modifying a string into alternative ways that string might be typed as intended (e.g., without misspellings and/or mistypings). The set of name variants may be generated by applying some or all of the rules specified by the form generator to the canonical name and each of its explicitly-provided aliases. The name variant generator may have rules for generating various name variants for each name. For example, the name variant generator may substitute equivalent words (e.g., "co" for "company," "st" for "saint," "8" for "eight," etc.), drop words that may often be omitted (e.g., noise words such as "of," "and,", "inc," etc.), replace multi-word names by its initials (e.g., "Hewlett-Packard" for "HP"), remove leading words, and the like. A given name variant may be the result of applying multiple rules of the name variant generator and/or applying a rule of the name variant generator multiple times.

For each of these name variants, the name variant generator may compute a penalty value representing an estimate of the unlikeliness of choosing a generated alias rather than a canonical name or explicit alias based on which it was generated. The penalty value may be zero or non-zero. If the same name variant may be generated as a result of applying the rules of the name variant generator in different orders or based on starting from different input strings (e.g., the canonical name and an explicit alias), and each of these manners of generating the name variant is associated with a different penalty value, the penalty value associated with the name variant may be taken to be the least of the different penalty values.

For each name, the name variant generator may collect the possible name variants and the lowest penalty value assigned to each name variant. For each name variant, the name variant generator may generate in the unsorted nodes file a line containing the normalized version of the name variant (e.g., "hewlettpackard" for "Hewlett-Packard"), the index of the name in the names table, which may be the line number in the input file or a value computed based on the line number in the input file, and the penalty value associated with the name variant. The resulting file may then be sorted to form the sorted nodes file. The sorting may be performed such that all lines whose normalized name variant contain a common prefix form a contiguous range of lines in the sorted nodes file. In some examples, this may be accomplished by running a line-based lexicographic sort on the file.

The sorted nodes file may be used to create the trie file by building a representation of a portion of a trie representing all of the nodes that would have been involved in parsing the most recently found name variant. When a new name variant is read in, it is compared with the previous name variant to identify the length of the common prefix (e.g., the number of initial characters they have in common). Because the file is sorted, nodes representing any characters after that point are no longer needed and may be closed by adding their information to a more space-efficient array-based representation. New nodes may then be created for any characters of the new name variant following the common prefix length. After the last line is processed, remaining nodes may be closed and the array-based representation may be written out as the trie file.

Figure 9:
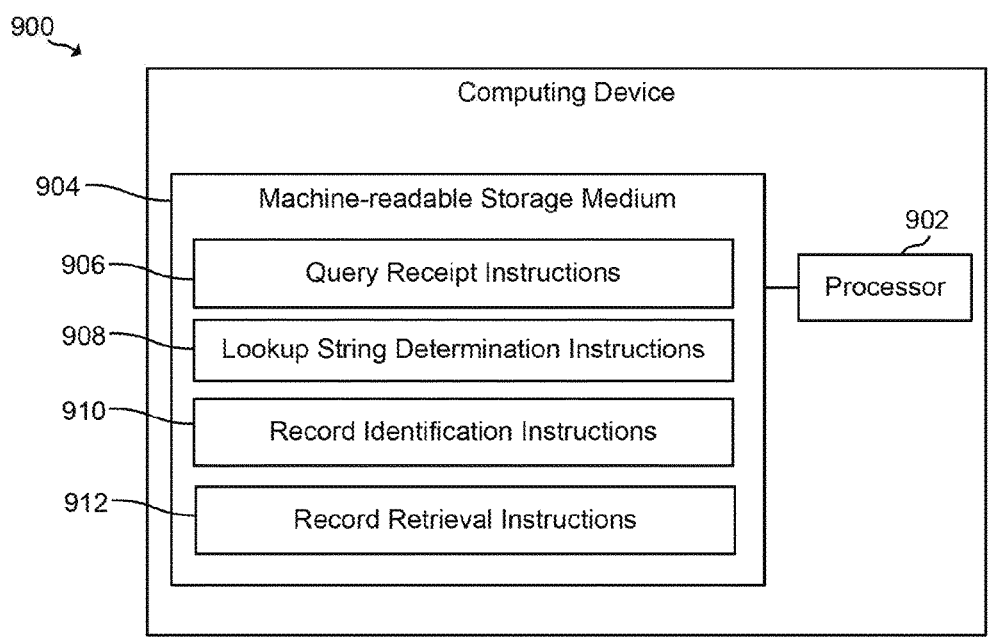
FIG. 9 is a block diagram of an example computing device for providing database records using tries associated with the database records.

FIG. 9 is a block diagram of an example computing device 900 for providing database records using tries associated with the database records, Computing device 900 may receive an input, and in response, matching records in a database may be provided based on at least one trie associated with the records in the database.

Computing device 900 may be, for example, a web-based server, a local area network server, a cloud-based server, a notebook computer, a desktop computer, an all-in-one system, a tablet computing device, a mobile phone, an electronic book reader, a printing device, or any other electronic device suitable for providing database records using tries associated with the database records, Computing device 900 may include a processor 902 and a machine-readable storage medium 904. Computing device 900 may use at least one trie to identify matching records associated with an input and provide the matching records to a user.

Processor 902 is a tangible hardware component that may be a CPU, a semiconductor-based microprocessor, and/or other hardware devices suitable for retrieval and execution of instructions stored in machine-readable storage medium 904. Processor 902 may fetch, decode, and execute instructions 906, 908, 910, and 912 to control a process of providing database records using tries associated with the database records. As an alternative or in addition to retrieving and executing instructions, processor 902 may include at least one electronic circuit that includes electronic components for performing the functionality of instructions 906, 908, 910, 912, or a combination thereof.

Machine-readable storage medium 904 may be any electronic, magnetic, optical, or other physical storage device that contains or stores executable instructions. Thus, machine-readable storage medium 904 may be, for example, Random Access Memory (RAM), an Electrically Erasable Programmable Read-Only Memory (EEPROM), a storage device, an optical disc, and the like. In some examples, machine-readable storage medium 904 may be a non-transitory storage medium, where the term "non-transitory" does not encompass transitory propagating signals. As described in detail below, machine-readable storage medium 904 may be encoded with a series of processor executable instructions 906, 908, 910, and 912 for receiving a first query string; determining, based on the first query string, a first lookup string associated with a first plurality of words in a first order; identifying, based on the first lookup string and a first trie associated with the first lookup string, a first set of records from a database of records, each record in the first set of records being associated with a score that is associated with a degree to which each record matches the first query string, wherein the first set of records is identified based on a penalty value calculated for each record based on a first hypothesized collection of typing errors sufficient to transform a prefix of a string associated with each record into the lookup string; and providing a result based on the first set of records. In some examples, at least one string associated with at least one record is an alternative form of another string included in data associated with the at least one record.

Query receipt instructions 906 may manage and control receipt of queries from users, including managing and controlling the receipt of query strings. For example, query receipt instructions 906 may receive one or more query strings inputted into a field in user interface 200 of FIG. 2.

Lookup string determination instructions 908 may manage and control a determination of one or more lookup strings associated with the received query string. For example, lookup string determination instructions 908 may determine, based on a received query string, a lookup string associated with a plurality of words in a particular order. In some examples, the lookup string may be the same as the received query string (e.g., as described in FIG. 5), or may be a transformation of the received query string (e.g., as the result of normalizing the received query string, as described in operation 502 of FIG. 5). In some examples, the lookup string may be a portion of the received query string (e.g., a phrase extracted from the received query string, as described in operation 814 of FIG. 8).

Record identification instructions 910 may manage and control the identification of records based on the determined lookup string and a trie associated with the lookup string. For example, record identification instructions 910 may identify, based on the lookup string and a trie associated with the lookup string, a set of records from a database of records, where each record in the set of records is associated with a score that is associated with a degree to which each record matches the received query string and where the set of records is identified based on a penalty value calculated for each record based on a hypothesized collection of typing errors sufficient to transform a prefix of a string associated with each record into the lookup string. In some examples, at least one string associated with at least one record may be an alternative form of another string included in data associated with at least one record. In some examples, the penalty value may be calculated based on a first penalty value associated with a first class of typing error and a second penalty value associated with a second class of typing error, where the second penalty value is different from the first penalty value.

Record retrieval instructions 912 may manage and control the providing of a result based on the set of records identified. For example, record retrieval instructions 912 may provide, as a response to the received query string, a result that displays information from any number of records in the set of records identified by record identification instructions 910.

In some examples, computing device 900 may identify a first cursor set based on the lookup string, where each cursor in the first cursor set is associated with a node in the trie and with a corresponding penalty value computed based on a second hypothesized collection of typing errors sufficient to transform a prefix associated with the node into the lookup string, and may calculate a second cursor set based on the first cursor set and a character in the first lookup string.

In some examples, the first trie may be associated with a first data field associated with the database of records, and computing device 900 may determine a second lookup string that is non-overlapping with the first lookup string. Based on the second lookup string and a second trie associated with the second lookup string, computing device 900 may calculate a second set of records, where each record in the second set of records is associated with a score that is associated with a degree to which each record in the second set of records matches the query string and where the result is based on the first set of records and the second set of records.

In some examples, computing device 900 may receive a second query string and determine, based on the second query string, a second lookup string associated with a second plurality of words in a second order, where the second plurality of words has the same words as the first plurality of words and the second order differs from the first order. Based on the second lookup string and the first trie, computing device 900 may identify a second set of records from the database of records, where the second set of records differs from the first set of records.

In some examples, computing device 900 may access a cache and determine that at least a portion of the query string is associated with data stored in the cache, where the first set of records is identified based on establishing a starting context based on the data stored in the cache.

Figure 10:
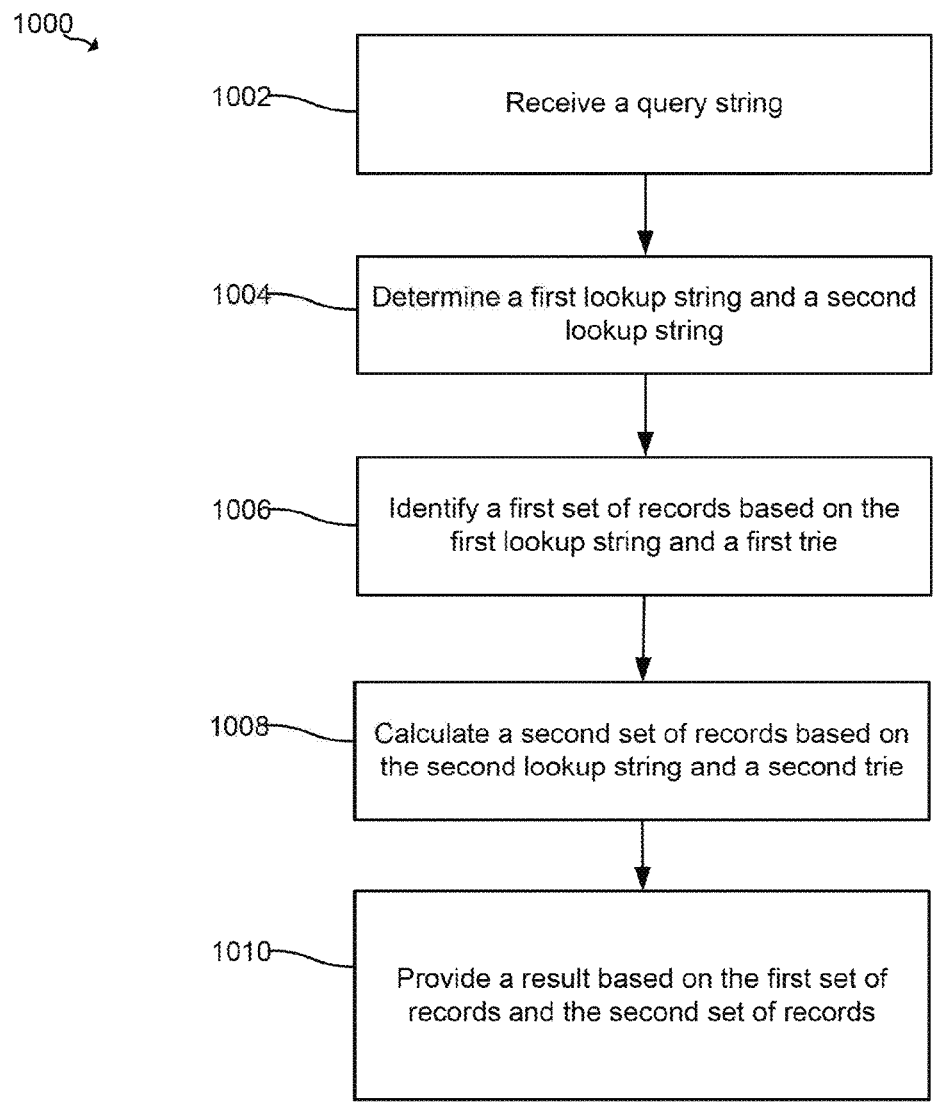
FIG. 10 is a flowchart illustrating an example method of providing database records using tries associated with the database records.

FIG. 10 is a flowchart illustrating an example method 1000 of providing database records using tries associated with the database records. Method 1000 may be implemented using computing device 900 of FIG. 9.

Method 1000 includes, at 1002, receiving a query string. For example, in FIG. 2, the query string "anti square 3102" in field 202 may be received via user interface 200.

Method 1000 also includes, at 1004, determining a first lookup string and a second lookup string. For example, a first lookup string associated with a first data field and a second lookup string that is non-overlapping with the first lookup string may be determined.

Method 1000 also includes, at 1006, identifying a first set of records based on the first lookup string and a first trie. For example, based on the first lookup string and a first trie associated with the first lookup string, a first set of records from a database of records may be identified, where each record in the first set of records may be associated with a first score that is associated with a degree to which each record matches the query string. The first set of records may be identified based on a penalty value calculated for each record based on a hypothesized collection of typing errors sufficient to transform a prefix of a string associated with each record into the first lookup string.

Method 1000 also includes, at 1008, calculating a second set of records based on the second lookup string and a second trie. For example, based on the second lookup string and a second trie associated with a second data field, a second set of records from the database of records may be calculated, where each record in the second set of records may be associated with a second score that is associated with a degree to which each record in the second set of records matches the query string.

Method 1000 also includes, at 1010, providing a result based on the first set of records and the second set of records. For example, as a response to the received query string, a result that displays information from any number of records in the first and second set of records may be provided.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, memristor memory, and the like.

What is claimed is:

1. A computing device comprising:
   at least one processor to:
   receive a first query string;
   determine, based on the first query string, a first lookup string associated with a first plurality of words in a first order;
   identify, based on the first lookup string and a first trie associated with the first lookup string, a first set of records from a database of records, each record in the first set of records being associated with a first score that is associated with a degree to which each record matches the first query string, wherein the first set of records is identified based on a penalty value calculated for each record based on a first hypothesized collection of typing errors sufficient to transform a prefix of a string associated with each record into the first lookup string; and
   provide a result based on the first set of records.

2. The computing device of claim 1, wherein the at least one processor is further to:
   identify a first cursor set based on the first lookup string, wherein each cursor in the first cursor set is associated with a node in the first trie and with a corresponding penalty value computed based on a second hypothesized collection of typing errors sufficient to transform a prefix associated with the node into the first lookup string; and calculate, based on the first cursor set and a character in the first lookup string, a second cursor set.

3. The computing device of claim 1, wherein the first trie is associated with a first data field associated with the database of records and wherein the at least one processor is further to:

determine a second lookup string that is non-overlapping with the first lookup string; and calculate, based on the second lookup string and a second trie associated with a second data field, a second set of records, wherein each record in the second set of records is associated with a second score that is associated with a degree to which each record in the second set of records matches the first query string, wherein the result is based on the first set of records and the second set of records.

4. The computing device of claim 1, wherein at least one string associated with at least one record is an alternative form of another string included in data associated with the at least one record.

5. The computing device of claim 1, wherein the at least one processor is further to:

receive a second query string;

determine, based on the second query string, a second lookup string associated with a second plurality of words in a second order, wherein the second plurality of words has the same words as the first plurality of words and the second order differs from the first order; and identify, based on the second lookup string and the first trie, a second set of records from the database of records, wherein the second set of records differs from the first set of records.

6. The computing device of claim 1, wherein the penalty value is calculated based on a first penalty value associated with a first class of typing error and a second penalty value associated with a second class of typing error, the second penalty value being different from the first penalty value.

7. The computing device of claim 1, wherein the at least one processor is further to:

access a cache; and determine that at least a portion of the first query string is associated with data stored in the cache, wherein the first set of records is identified based on establishing a starting context based on the data stored in the cache.

8. A method, comprising:

receiving, by a computing device, a query string;

based on the query string, determining, by the computing device, a first lookup string associated with a first data field and a second lookup string that is non-overlapping with the first lookup string;

based on the first lookup string and a first trie associated with the first lookup string, identifying, by the computing device, a first set of records from a database of records, each record in the first set of records being associated with a first score that is associated with a degree to which each record matches the query string, wherein the first set of records is identified based on a penalty value calculated for each record based on a first hypothesized collection of typing errors sufficient to transform a prefix of a string associated with each record into the first lookup string;

based on the second lookup string and a second trie associated with a second data field, calculating, by the computing device, a second set of records from the database of records, each record in the second set of records being associated with a second score that is associated with a degree to which each record in the second set of records matches the query string; and providing, by the computing device, a result based on the first set of records and the second set of records.

9. The method of claim 8, wherein the first lookup string is associated with a first plurality of words in a first order and wherein the method further comprises:

receiving, by the computing device, a second query string;

based on the second query string, determining, by the computing device, a third lookup string associated with a second plurality of words in a second order, wherein the second plurality of words has the same words as the first plurality of words and the second order differs from the first order; and based on the third lookup string and the first trie, identifying, by the computing device, a third set of records from the database of records, wherein the third set of records differs from the first set of records.

10. The method of claim 8, further comprising:

identifying, by the computing device, a first cursor set based on the first lookup string, wherein each cursor in the first cursor set is associated with a node in the first trie and with a corresponding penalty value computed based on a second hypothesized collection of typing errors sufficient to transform a prefix associated with the node into the first lookup string; and based on the first cursor set and a character in the first lookup string, calculating, by the computing device, a second cursor set.

11. The method of claim 8, wherein at least one string associated with at least one record is an alternative form of another string included in data associated with the at least one record.

12. A non-transitory machine-readable storage medium storing instructions that, if executed by at least one processor of a computing device, cause the computing device to:

receive a first query string;

determine, based on the first query string, a first lookup string;

identify, based on the first lookup string and a first trie associated with the first lookup string, a first set of records from a database of records, each record in the first set of records being associated with a first score that is associated with a degree to which each record matches the first query string, wherein the first set of records is identified based on a penalty value calculated for each record based on a first hypothesized collection of typing errors sufficient to transform a prefix of a string associated with each record into the first lookup string, wherein at least one string associated with at least one record is an alternative form of another string included in data associated with the at least one record; and provide a result based on the first set of records.

13. The non-transitory machine-readable storage medium of claim 12, wherein the instructions further cause the computing device to:

identify a first cursor set based on the first lookup string, wherein each cursor in the first cursor set is associated with a node in the first trie and with a corresponding penalty value computed based on a second hypothesized collection of typing errors sufficient to transform a prefix associated with the node into the first lookup string; and calculate, based on the first cursor set and a character in the first lookup string, a second cursor set.

14. The non-transitory machine-readable storage medium of claim 12, wherein the first lookup string is associated with a first plurality of words in a first order and wherein the instructions further cause the computing device to:

receive a second query string;

based on the second query string, determine a second lookup string associated with a second plurality of words in a second order, wherein the second plurality of words has the same words as the first plurality of words and the second order differs from the first order; and based on the second lookup string and the first trie, identify a second set of records from the database of records, wherein the second set of records differs from the first set of records.

15. The non-transitory machine-readable storage medium of claim 12, wherein the first trie is associated with a first data field associated with the database of records and wherein the instructions further cause the computing device to:

determine a second lookup string that is non-overlapping with the first lookup string; and calculate, based on the second lookup string and a second trie associated with a second data field, a second set of records, wherein each record in the second set of records is associated with a second score that is associated with a degree to which each record in the second set of records matches the first query string, wherein the result is based on the first set of records and the second set of records.

* * * * *